United States Patent [19]

Okamoto et al.

[11] 4,394,772
[45] Jul. 19, 1983

[54] RADIOGRAPHIC CASSETTE

[75] Inventors: Tadaomi Okamoto, Fujisawa; Masayuki Ohta, Sakado; Makoto Watanabe, Tokyo, all of Japan

[73] Assignee: Okamoto Manufacturing Co., Ltd., Tokyo, Japan

[21] Appl. No.: 326,839

[22] Filed: Dec. 3, 1981

[30] Foreign Application Priority Data

Oct. 6, 1981 [JP] Japan .......................... 56-148420[U]

[51] Int. Cl.³ ............................................. G03B 41/16
[52] U.S. Cl. ...................................... 378/182; 378/98
[58] Field of Search ................................. 378/182, 98

[56] References Cited

U.S. PATENT DOCUMENTS 2,900,514 8/1959 Boucher .............................. 378/182
3,655,972 4/1972 Somerset ............................ 378/182

Primary Examiner—Alfred E. Smith
Assistant Examiner—T. N. Grigsby
Attorney, Agent, or Firm—Cantor and Lessler

[57] ABSTRACT

A radiographic cassette comprises a film-receiving plate and a film-keeping plate engageable with the film-receiving plate. The cassette is further provided with an external indicator which enables an operator to visually check whether or not the cassette has been loaded with a film.

1 Claim, 4 Drawing Figures

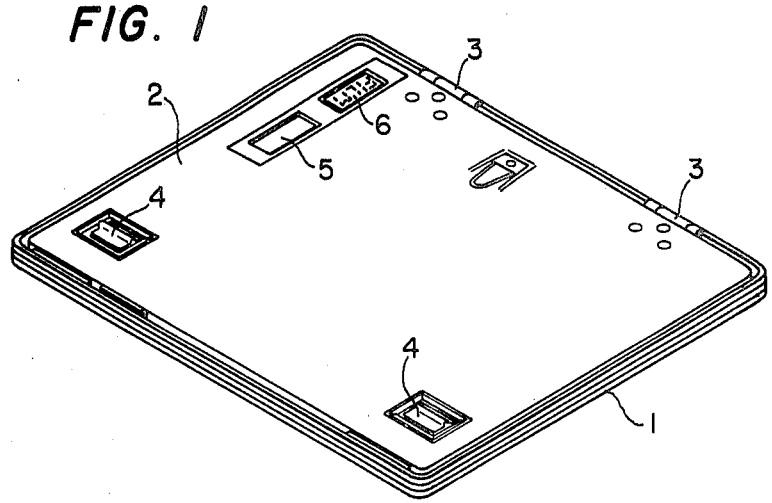
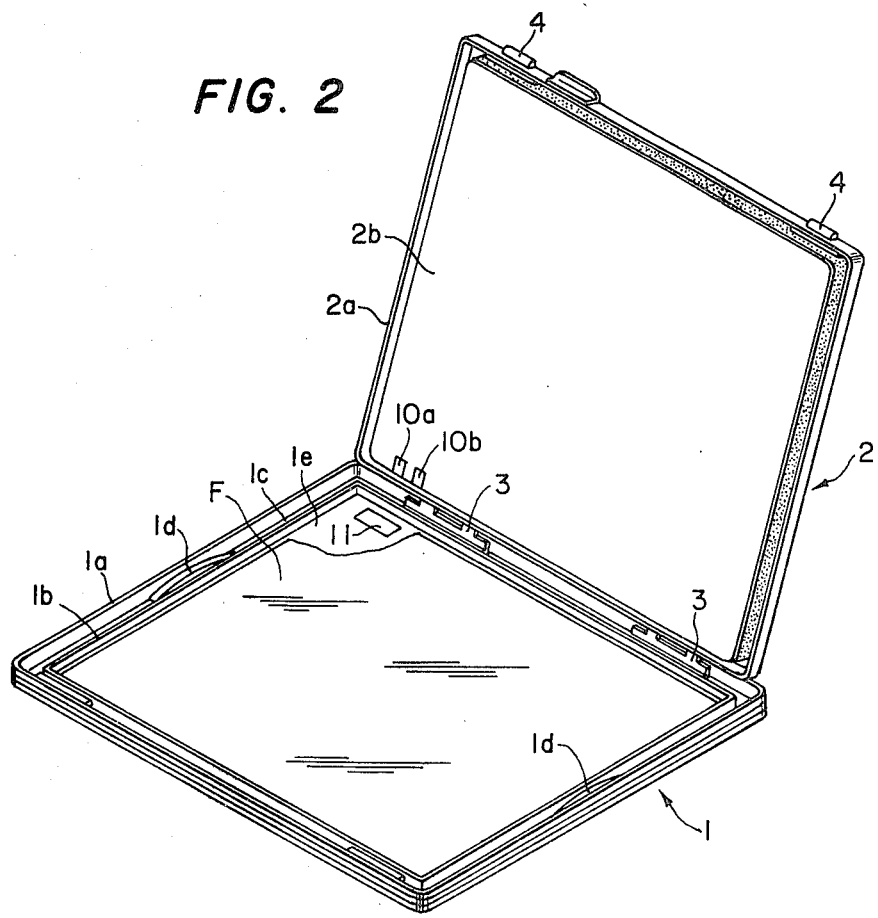

RADIOGRAPHIC CASSETTE

DETAILED DESCRIPTION OF THE INVENTION

The present invention relates to a radiographic casseete with a built-in indicator which enables an operator to visually check whether or not the cassette has been loaded with a film.

With the conventional cassette of this type, it is necessary to open it in a darkroom to check the presence of a film since no external indicator means is provided.

A main object of the present invention is to provide a solution to the aforesaid problem. According to the present invention, this object is achieved by the provision of a radiographic cassette comprising a film-receiving plate and a film-keeping plate engageable with said film-receiving plate in light-tight relation to press a film against said film-receiving plate, characterized in that said film-keeping plate is provided with a solar battery and a liquid crystal indicator adapted to be actuated by currents therefrom, both being open to view, and provided on its inner surface with a pair of conductive planes isolated from each other and connected to said battery, and said film-receiving plate is provided on an associated position of its inner surface with a conductive plane which is adapted to come in contact with said conductive planes to cause shorting.

When the cassette has not been loaded with a film, the indicator is blank since the said pair of short-circuiting conductive planes of the front side of the film-keeping plate come in contact with the conductive plane of the film-receiving plate to cause shorting. When the cassette has been loaded with a film, on the other hand, the indicator displays the word "FILM" or the like since the short-circuiting conductive planes are isolated from each other by the film positioned between the film-receiving and-keeping plates to prevent shorting.

BRIEF DESCRIPTION OF THE DRAWINGS

The main and other objects of the present invention will become apparent from a reading of the following detailed explanation of one preferred embodiment illustrated in the accompaying drawings, in which:

FIG. 1 is a perspective view of the cassette according to the present invention in a closed state;

FIG. 2 is a perspective view of the cassette in an opened state;

PREFERRED EMBODIMENT OF THE INVENTION

Figure 3:
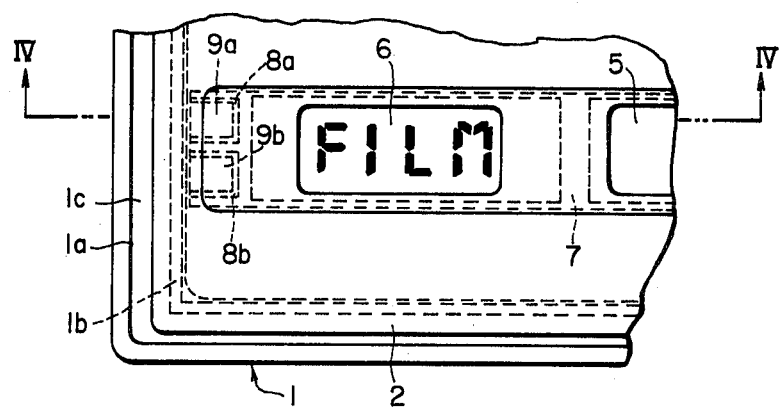
FIG. 3 is an enlarged plan view of the solar battery and the indicator used with the cassette.
Figure 4:
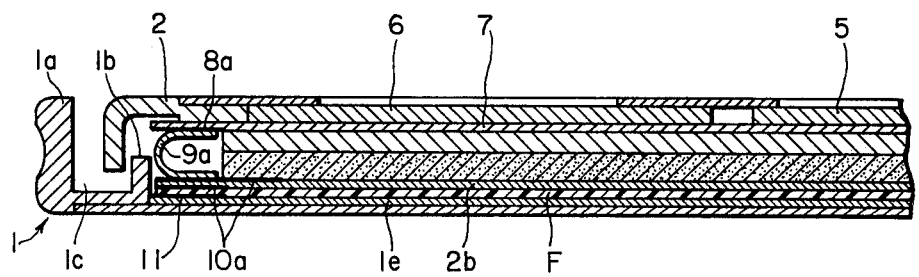
FIG. 4 is a sectional view taken along the line IV—IV of FIG. 3.

Referring now to the drawings, a film-receiving plate 1 is hinged at 3 to a film-keeping plate 2, and is engageable therewith by means of locking pieces 4.

The plate 1 is provided with an outer edge 1a and an inner edge 1b between which is positioned a groove 1c having therein springs 1d for forcing up the plate 2. The film-receiving plane 1e is then defined by the inner edge 1b.

The film-keeping plate 2 is provided with an outer edge 2a engageable within the groove 1c in the plate, which defines a film-keeping plane 2b in association with the film-receiving plane 1e. The plate 2 is also provided on its one side with a solar battery 5 and an liquid crystal indicator 6 adapted to be actuated by currents therefrom, both elements being open to view.

The battery 5 and the idicator 6 are supported on the front side of a substrate 7, and connected to an electric circuit formed on the rear side thereof. The substrate 7 is provided on the rear side of its one end with a pair of U-shaped connecting pieces 9a and 9b insulated from each other, said pieces being connected to the electric circuits and formed on a pair of conductive palnes 8a and 8b insulated from each other. Coming in contact with both connecting pieces, conductive planes 10a and 10b are isolatively formed on the inner surface of the plate 2, i.e., the film-keeping plane 2b in such a manner that they are open to view. The plate 1 is then provided at an associated position of its inner surface, i.e., the film-receiving plane 1e with a short-circuiting conductive plane 11 which comes in contact with the conductive planes 10a and 10b for energization.

When a film F is placed on the film-receiving plane 1e of the plate 1 followed by engagement of the plate 2 with the plate 1, the conductive planes 10a and 10b of the plate 2 are isolated from the short-circuiting conductive plane 11 by the film F, so that the conductive planes 10a and 10b are not short-circuited to permit the indicator to display the word "FILM" or the like. When the cassette has not been loaded with the Film F, the indicator is blank since the conductive planes 10a and 10b come in contact with the short-circuiting conductive plane 11 and show shorts.

With the arrangemnt illustrated, it is possible to check forthwith the presence of a film in the cassette with no need of opening it in a darkroom. Thus, the present invention adds a great advantage to the art.

What is claimed is:

1. A radiographic cassette comprising a film-receiving plate and a film-keeping plate engageable with said film-receiving plate in light-tight relation to press a film against said film-receiving plate, in which said film-keeping plate is provided with a solar battery and a liquid crystal indicator adapted to be actuated by currents therefrom, both being open to view, and provided on its inner surface with a pair of conductive planes isolated from each other and connected to said battery, and said film-receiving plate is provided on an associated position of its inner surface with a conductive plate which is adapted to come in contact with said conductive planes to cause shorting.

* * * * *